Jan. 28, 1930.  A. H. HARVEY  1,745,168
DESICCATING APPARATUS
Filed May 8, 1928  2 Sheets-Sheet 1

INVENTOR
ARTHUR H. HARVEY
BY
ATTORNEY

Jan. 28, 1930.  A. H. HARVEY  1,745,168
DESICCATING APPARATUS
Filed May 8, 1928   2 Sheets-Sheet 2
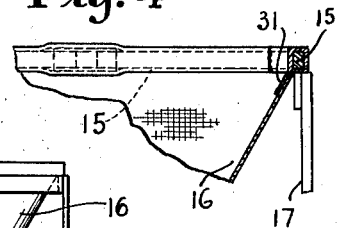
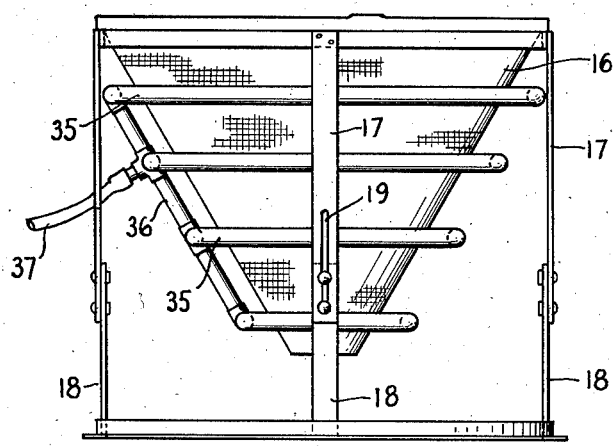
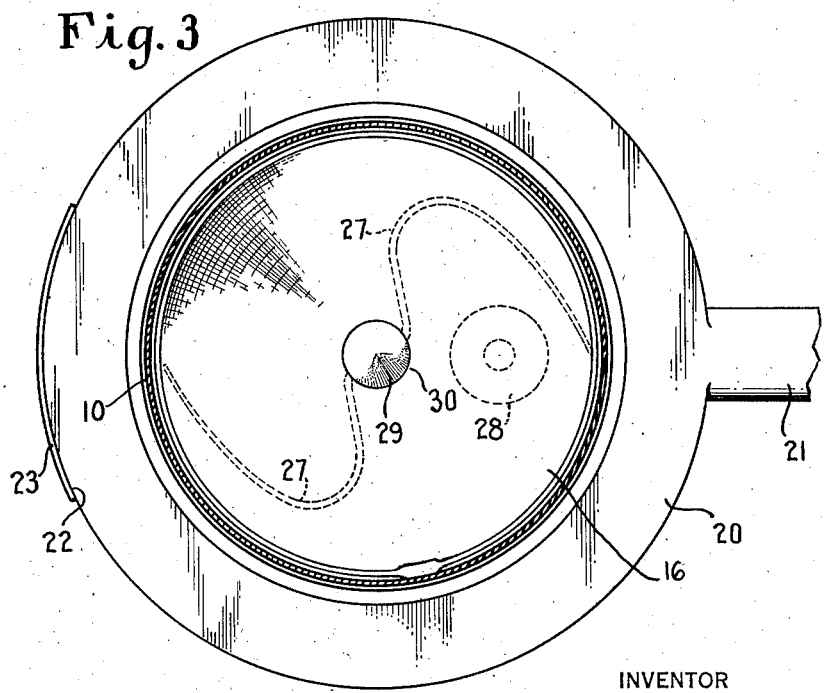
INVENTOR
ARTHUR H. HARVEY
BY
ATTORNEY Patented Jan. 28, 1930

1,745,168

UNITED STATES PATENT OFFICE

ARTHUR H. HARVEY, OF ELIZABETH, NEW JERSEY, ASSIGNOR TO BOWEN RESEARCH CORPORATION, OF WESTFIELD, NEW JERSEY, A CORPORATION OF NEW JERSEY

DESICCATING APPARATUS

Application filed May 8, 1928. Serial No. 275,992.

The invention relates to desiccating apparatus for the drying of liquids, semi-liquids, liquid emulsions, slurries, juices, syrups and other solid-containing liquids, and more especially by the introduction into a current of heated gaseous medium of such liquid in a finely divided state and as may be attained by atomizing, spraying or centrifugally disintegrating the same. The desiccation operation, as conducted in the novel apparatus, is according to the concurrent principle, that is to say, the general direction of flow of desiccating medium and the direction of flow of the particles of material dried thereby are substantially the same; and, especially in the case of drying of fruit juices, the operations are conducted under conditions conducive to retention of their aromatic ethers, essential oils, etc., as in the provision of a novel type of cooling zone to which the particles are exposed immediately before, at the time of or immediately after having the moisture removed therefrom.

The invention has for its object a novel arrangement for affording such cooling zone portion in connection with desiccating apparatus, as well as the regulation of the position of the same in accordance with the product desiccated and the temperature and pressure conditions of the desiccating medium involved. A further object of the invention relates also to means for regulating the velocity of the spent gases as discharged from the desiccating chamber.

In carrying out the invention, a casing providing the desiccating chamber is constructed in a novel manner, more particularly in relation to its discharge end which is arranged to be adjustable axially relatively to the stationary portion of the casing and thereby to vary the effective length of the path of travel of the desiccated particles; and provision may be made at the same time for cooling this portion of the chamber or tower so that the relative position of the cooling zone afforded is also variable.

Furthermore, the invention contemplates a novel type of outlet end or portion of the drying tower in constituting the same as a foraminous material, such as fabric which, being of a relatively low specific heat, provides for a marked cooling effect on particles which may come in contact therewith. Moreover, this foraminous material will admit of the introduction of a surrounding cooling medium to the interior of the said drying chamber portion to form a skin or shell of cool gaseous medium over its inner face, if a negative pressure be set up within the same as by providing flow-inducing means for circulating the desiccating medium through said chamber. Or, preferably, positive cooling means may be provided about said adjustable outer portion of the casing to be movable therewith and afford jets of cooling medium which may be directed radially toward said portion.

The nature of the invention, however, will best be understood when described in connection with the accompanying drawings, in which:

Fig. 2 is a detail fragmentary elevation of the lowermost or adjustable portion of the desiccating tower, with portion indicated in section.

Fig. 3 is a transverse section through the desiccating apparatus and taken on the line 3—3, Fig. 1, looking in the direction of the arrows.

Fig. 4 is a fragmentary detail sectional view illustrating the manner of securing the material comprising the lower adjustable portion of the tower.

Figure 1:
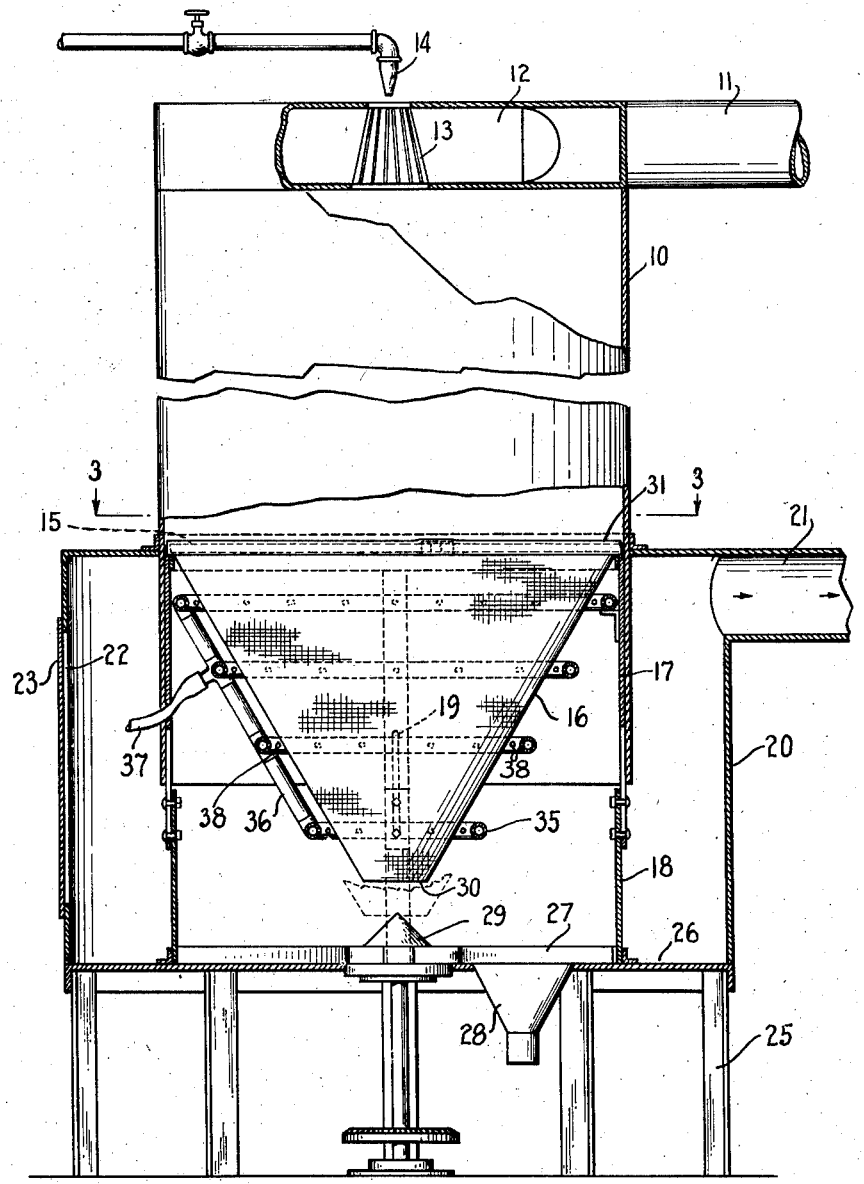
Fig. 1 is a vertical section partly in elevation illustrating the novel desiccating apparatus.

Referring to the drawings, 10 designates a casing which may be a cylindrical vertically disposed tower, as indicated, suitably proportioned to conform to the capacity desired and mode of treatment in view, and affording a desiccating chamber wherein solid-containing liquid in finely divided state is to be desiccated by contact with a gaseous medium introduced therein simultaneously with the said liquid. This gaseous medium may be introduced from a flue or supply duct 11 into the distributing casing or chamber 12 closing the top of said desiccating chamber and having a centrally disposed opening 13 through which are introduced the gaseous medium and a solid-containing liquid.

In the particular embodiment illustrated, the liquid is directed axially into the casing 10 from a suitable disintegrating device as the spray nozzle member or the like 14; and by means of which liquid in a more or less highly subdivided condition is directed axially into the interior of said casing 10 to meet with the incoming more or less heated gaseous medium which surrounds the same and is intermingled therewith. Thereby the solid constituents of the liquid become dried and fall downwardly through the casing when the same is vertically positioned as indicated; or, said particles may be withdrawn therefrom by suitable flow-inducing means (not shown) to be located exteriorly of the casing, all of which is well understood and forms no particular part of the present invention.

The present invention relates more especially to the provision of a novel and independent outlet portion for the casing 10 and to the arrangement whereby the same is axially adjustable relatively thereto. As illustrated more particularly in Figs. 1 and 2 of the drawings, there is fitted within the casing 10, the latter in this instance being cylindrical, a split ring 15 which is designed to slide axially therein and to make a more or less tight contact with the inner wall of said casing. This ring carries the outlet or bottom portion 16 of the desiccating tower and hereinafter more fully described. To adjustably support said ring with attached outlet portion 16, there is secured to the underside of the former a plurality of bars or supporting members 17, which, in turn, are designed to be supported by uprights 18, as by bolting the same thereto, the said bars being slotted longitudinally as at 19 to accommodate the adjustment.

Surrounding the lower end of casing 10 as well as the portion 16 of the desiccating tower, is a further enclosing casing 20 designed to receive the spent gases which may be withdrawn therefrom through an outlet duct 21, for example by a suitable flow-inducing means or suction device (not shown) or merely under the inherent pressure of the supplied gaseous desiccating medium, all of which is well understood. The casing 20, moreover, may be provided with an opening 22 and closure member 23 whereby, when the latter is removed, access may be had to the interior of the tower to adjust portion 16 thereof to the desired position axially relatively to the desiccating portion 10. Casing 20, as well as the casing 10 with outlet portion 16, is mounted upon a suitable supporting structure 25 which retains also a bottom plate 26 for the desiccating apparatus including the casing 20; and over a portion of this floor or plate is designed to travel a rotatable rake or scraper device 27 for removing and discharging through an outlet hopper 28 of the bottom the desiccated material accumulating thereon.

The central portion of said rake or scraper device, moreover, carries an inwardly directed conical member or cap 29 designed to divert laterally the spent gases issuing from the mouth 30 of the conical portion 16 to assist in the depositing of the desiccated material upon the bottom plate 26, these particles of desiccated material leaving the mouth 30 at relatively high velocity so that the said solids in suspension tend to become whipped out of the gaseous medium by centrifugal force and to be disposed on said plate to be removed as hereinbefore described. By adjusting the mouth 30 relatively to cone 29, for example, as indicated in dotted lines, Fig. 1 of the drawings, the annular cross-sectional area of outlet may be varied to alter the velocity of flow and degree and extent of diversion of the particles of desiccated material.

The principal feature, however, in relation to the axial adjustment of said portion 16, resides in the ability thereby to change the removal zone of the desiccated particles, and more particularly in relation to the provision of a cooling portion at this stage of the process. This is effected in the novel manner herein shown, either by providing for the positive impingement on the portion 16 of a cooling medium, as in directing jets of cooled air thereto; or, by constructing the said portion 16 of a material having low specific heat such as organic material or fabric; or both expedients may be adopted. It will be understood that when organic or like material is employed the same will be of a nature such as not to be readily combustible, the character of same, however, depending upon the prevailing temperatures in the said portion 16; and I have found that material such as canvas is particularly suitable for this purpose, especially when the outlet temperatures of the desiccating gases approximate 300° F.

When utilizing material of the aforesaid character the same may conveniently be hung from the ring 15 by passing said ring through a hem 31 along the upper edge of the material. For higher degrees of outlet temperatures of these gases material such as asbestos may be utilized. Or, the portion 16 may be constructed of non-foraminous material such as sheet metal or other suitable inorganic material.

The final temperature of the drying gases will, of course, be determined by the amount of moisture it is desired to retain in the finished products, as well as by the ease by which moisture is freed from the solid particles and the character of the material treated. The amount of contained moisture and velocity with which the product gives up its moisture and the temperature of the gaseous drying medium are the controlling factors in determining the length of time necessary for exposure of the finely divided material thereto; and it will be appreciated that by thus not only being able to change the position of said outlet portion 16 axially but also by the provision of means for cooling the same either positively or inherently, a ready means is afforded for conducting the desiccation under the most favorable conditions.

Certain materials, for example, fruit juices and the like, have particularly low temperature characteristics; and while the exposure of the same to comparatively high temperatures initially is not objectionable so long as the same is only momentary, due to the fact that no serious effects result in view of a refrigerating action occurring because of rapid and intense evaporation produced, such particles must, immediately before, at the time of or immediately after having the moisture removed therefrom, be subjected to a cooling action in order to prevent objectionable caramelization taking place and the loss of aromatic ethers and essential oils therefrom. Also, when the outlet zone is at too high a temperature, the dried particles may melt and become sticky and coalesce and thus lose their desirable powder form.

As stated, this desirable cooling action may be inherent in the material constituting the portion 16 itself, or may be positively applied thereto, or both expedients may be adopted. For example, as indicated, a series of concentric circular distributing pipes 35 may be mounted about the lower portion 16, being movable with its supporting frame and communicating with a header member 36. The latter, in turn, is connected with a suitable source (not shown) of cooling medium, such as air under pressure, by means of a flexible connection as the hose 37, while said circular members 35 are provided with orifices 38 directed radially toward the outer surface of the portion 16 and whereby a plurality of jets of the cooling medium issue therefrom to lower the temperature of said portion 16 to the desired extent. This will serve, also, to obviate adhering of the desiccated particles to the inner surface by impingement thereon and is especially effective in the case where the wall of the portion 16 is of foraminous material such as canvas, hereinbefore noted. In this embodiment, the cooling medium enters more or less radially into the interior of the said portion to provide a lining or skin of cool gaseous medium over its inner surface.

I claim:

1. Desiccating apparatus for solid-containing liquids, comprising a casing, and means to vary the effective length of said casing and embodying an adjustable cooling zone.

2. Desiccating apparatus for solid-containing liquids, comprising a casing affording at one end a drying chamber into which a liquid is sprayed, and the other end being axially adjustable and embodying means affording a cooling zone.

3. Desiccating apparatus embodying a casing, and means to deliver solid-containing liquid in finely divided state to one end of said casing; and a frusto-conical casing slidably mounted in the opposite end of said casing to receive the desiccated particles and having an outlet opening at its outer end for discharging the same therefrom.

4. Desiccating apparatus embodying a casing, and means to deliver solid-containing liquid in finely divided state to one end of said casing; a frusto-conical casing slidably mounted in the opposite end of said casing to receive the desiccated particles and having an outlet opening at its outer end for discharging the same therefrom; and a collecting plate mounted beyond the outlet of said conical casing and having a conical portion coaxial with the outlet thereof adapted to coact therewith.

5. Desiccating apparatus embodying a desiccating casing, and means to deliver solid-containing liquid in finely divided state to one end of said casing, and means to introduce simultaneously therewith at said end into said casing a heated gaseous medium, an outlet casing or portion consisting of fabric, having an opening at its outer end for discharging desiccated particles therefrom, and means to slidably support said outlet casing at the opposite end of the said desiccating casing.

6. Desiccating apparatus embodying a casing, and means to deliver solid-containing liquid in finely divided state to one end of said casing, and means to introduce simultaneously therewith at said end into said casing a heated gaseous medium; a frusto-conical casing slidably mounted in the opposite end of said casing to receive the desiccated particles and having an outlet opening at its outer end for discharging the same therefrom; and means to adjustably support the outlet casing.

7. Desiccating apparatus embodying a casing, and means to deliver solid-containing liquid in finely divided state to one end of said casing, and means to introduce simultaneously therewith at said end into said casing a heated gaseous medium; a frusto-conical casing slidably mounted in the opposite end of said casing to receive the desiccated particles and having an outlet opening at its outer end for discharging the same therefrom; and means to adjustably support the outlet casing embodying a plurality of uprights, and longitudinally slotted bars extending from said outlet casing adapted to be bolted to the said uprights.

8. Desiccating apparatus embodying a desiccating casing, an adjustable outlet casing or portion consisting of fabric, and a confining frame about said casing and embodying cooling means movable therewith.

9. Desiccating apparatus for solid-containing liquids, comprising a casing, means to vary the effective length of said casing, and cooling means movable therewith.

10. Desiccating apparatus embodying a casing, and means to deliver solid-containing liquid in finely divided state to one end of said casing; a frusto-conical casing slidably mounted in the opposite end of said casing to receive the desiccated particles and having an outlet opening at its outer end for discharging the same therefrom; and cooling means for the outlet casing embodying coils of pipe having orifices directed toward the said casing and adapted to project jets of cooling medium toward the same.

11. Desiccating apparatus embodying a casing, and means to deliver solid-containing liquid in finely divided state to one end of said casing; a frusto-conical casing slidably mounted in the opposite end of said casing to receive the desiccated particles and having an outlet opening at its outer end for discharging the same therefrom; and cooling means for the outlet casing embodying coils of pipe having orifices directed toward the said casing and adapted to project jets of cooling medium toward the same, and a flexible connection to said coils for supplying a cooling medium.

12. Desiccating apparatus embodying a casing, and means to deliver solid-containing liquid in finely divided state to one end of said casing, and means to introduce simultaneously therewith at said end into said casing a heated gaseous medium; a ring slidable in the casing, and an outlet casing of flexible material suspended therefrom and having an outlet opening at its outer end for discharging desiccated particles therefrom; and means to adjustably support said ring.

13. Desiccating apparatus embodying a casing, and means to deliver solid-containing liquid in finely divided state to one end of said casing; a split ring slidable in the casing; and a flexible material forming an outlet casing and suspended from said ring.

In testimony whereof I affix my signature.

ARTHUR H. HARVEY.